April 6, 1937. H. W. ADAMS 2,076,191
CAMERA SHUTTER CONSTRUCTION
Filed Dec. 26, 1935
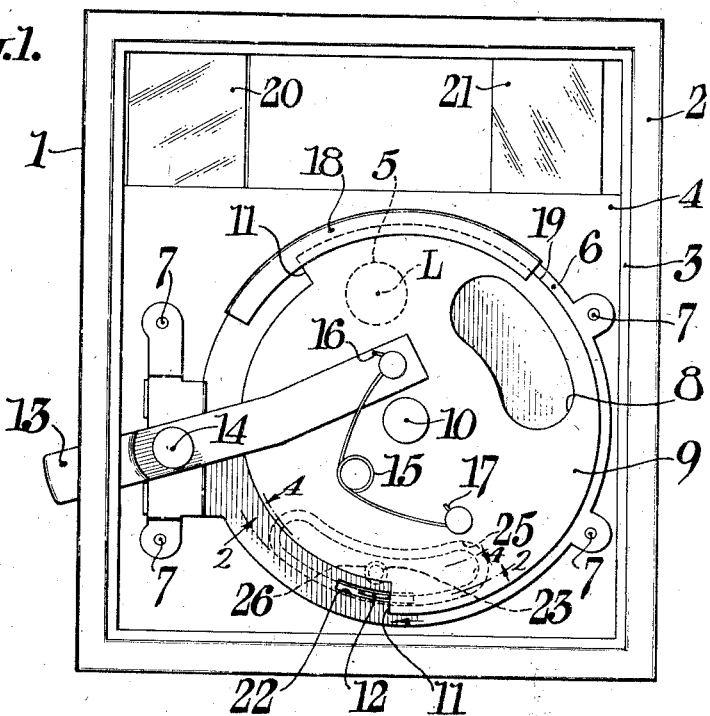
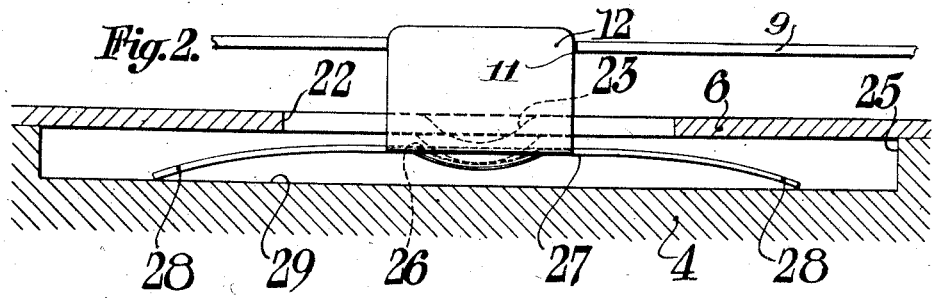
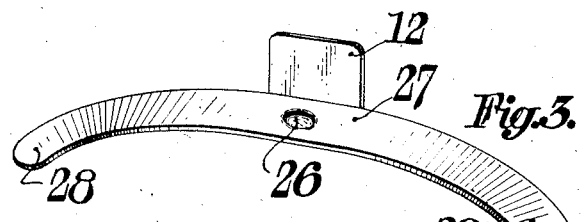
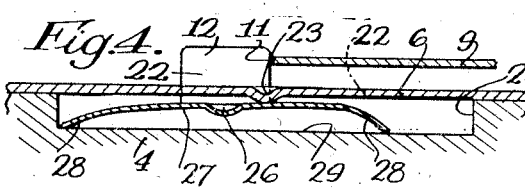
Harry W. Adams, INVENTOR
BY Newton M. Perrins,
Donald H. Stewart,
ATTORNEYS.

Patented Apr. 6, 1937

2,076,191

UNITED STATES PATENT OFFICE 2,076,191

CAMERA SHUTTER CONSTRUCTION

Harry W. Adams, Rochester, N. Y., assignor, by mesne assignments, to Eastman Kodak Company, Jersey City, N. J., a corporation of New Jersey Application December 26, 1935, Serial No. 56,129

5 Claims. (Cl. 95—59)

This invention relates to photography, and more particularly to shutters for photographic cameras. One object of my invention is to provide a shutter construction in which rebound of the shutter is prevented as the shutter blade suddenly comes to rest after making an exposure. Another object of my invention is to provide a shutter stop with a cushioning or shock absorbing arrangement which will tend to eliminate some of the noise which usually occurs when the shutter strikes a fixed stop. Still another object of my invention is to provide a stop for photographic shutters which has a forming spring-pressed into a second forming, the two formings being so shaped that limited movement of one part relative to the other is permitted, and other objects will appear from the following specification, the novel features being pointed out in the claims at the end thereof.

Coming now to the drawing wherein like reference characters denote like parts throughout:

Fig. 1 is a front plan view of a camera shutter with the shutter cover removed constructed in accordance with and embodying a preferred form of my invention.

Fig. 2 is an enlarged detail view partially in section showing the spring mounted shutter stop constructed in accordance with my invention, and Fig. 3 is an enlarged perspective view of the shutter stop removed from the shutter mechanism.

Fig. 4 is a sectional view similar to Fig. 2 and taken substantially on the line 4—4 of Fig. 1, showing the position of the shutter stop at the end of its movement.

In shutters which oscillate or revolve about a pivot in which it is necessary to suddenly bring the shutter to a stop after it has moved to make an exposure, it is desirable to cushion the blow of the shutter coming to a stop because it is possible for a shutter to strike a non-yielding stop and rebound to such an extent that the film previously exposed may be fogged.

In order to overcome this difficulty I have provided a movable shutter stop having a normal position of rest, this stop being so arranged relative to its support that as the stop moves from its normal position of rest, there is a camming action between the stop and support tending to increase the resistance of the stop against movement in such a way that shutter rebound is almost entirely eliminated and the noise of the shutter is considerably lessened.

Referring to Fig. 1 the camera may be of a well-known box type 1 having a front 2, around which there is a flange 3 for supporting a shutter cover plate (not shown). Inside of the flange 3 there may be a front board 4 which, in inexpensive cameras, is frequently made of wood. The shutter mechanism is mounted on this board, and there is an aperture 5 in the board for supporting the usual lens L.

The shutter mechanism is extremely simple and may consist of a metallic support 6 which may be attached to the front board 4 as by nails or screws 7. The plate 6 is apertured axially of the lens L so that light rays can pass through the aperture 5 and lens L when the slotted opening 8 in a shutter plate 9 passes the opening 5.

The shutter plate 9 is preferably pivoted upon a stud 10, upon which it may oscillate back and forth, the total amount of movement being limited by the shoulders 11 and the shutter stop 12. Thus the shutter may swing upon its pivot somewhat less than 180° when the shutter trigger 13 is moved upon its pivot 14 to tension and release the shutter spring 15 by causing the ends of the spring 16 and 17 to pass each other, thus energizing the spring.

If desired, the shutter plate 6 may have an edge 18 folded around a part of the periphery 19 of the shutter plate 9 so as to prevent light from entering through the lens L and fogging the film. Such light rays may pass beneath the shutter cover through the finders of the camera, the mirrors of which are indicated at 20 and 21.

The support 6 is provided with a slot 22 arcuate in form, through which the stop 12 may project. Adjacent the slot 22 is a forming 23 in the support, best shown in Fig. 4, this forming preferably being in the form of a rounded knob or protuberance which projects downwardly from the support 6 into a slot 25 which may be cut in the wooden block 4. The size and shape of the protuberance 23 can be so arranged that it will fit into a depression 26, see Figure 2, formed in a base plate 27 which is preferably provided with spring arms 28 which are adapted to engage the bottom wall 29 of the slotted board 4.

It should be especially noticed that the radii of curvature of the protuberance 23 is considerably less than the curvature of the depression 26 carried by plate 27, as best shown in Fig. 4, so that there may be limited movement between the stop 12 and the support 6. When one of the shoulders 11 on the shutter plate 9, under the impulse of spring 15, strikes the stop 12, the tendency is to move the stop in the direction that the shutter plate is moving. However, as the stop 12 is struck, the cooperating protuberance and recess permit limited movement of the stop, and as it moves from its normal position of rest shown in Fig. 2, the protuberance 23 rides up on the edge of the recess 26, causing the spring arms 28 to become tensioned so that as the stop 12 is moved the friction against the stop is automatically increased. As the shutter 9 continues its movement to the left, as viewed in Figs. 2 and 4, the protuberance 23 is cammed out of the depression 26, thus slightly depressing the base plate 27. After the protuberance 23 is clear of the depression 26, the member 27 then slides lengthwise in slot 25 until the left edge of the stop 12 engages the left edge of the slot 22 in the support 6, as shown in Fig. 4. This causes the shutter to come to rest, but not as suddenly as would occur if the shutter were to strike a fixed stop.

I am aware that resilient stops have been provided for shutters, rubber plugs and movable stops having been suggested for this purpose. However, it is believed that the stop which has been above described is particularly desirable because it cushions the blow of a shutter when moving in either of two directions, and as the stop is moved it offers a progressively increasing resistance so that it is not necessary to move the stop a material distance. In actual practice I have found that satisfactory results can be obtained by moving the stop less than a thirty-second of an inch, although the distance the stop may be moved can be readily varied by altering the size of the cooperating surfaces of the protuberance and recess in the shutter plate and stop.

What I claim is:

1. A shock absorber for camera shutters comprising a slotted support and a stop spring pressed against and projecting through the slotted support, cooperating means on the support and stop and comprising a projection on one part engaging a depression on the other part adapted to hold the parts in a normal position of rest, the walls of the depression and projection being so shaped as to increasingly retard movement of the stop relative to the support as the former is moved from its normal position of rest.

2. A shock absorber for camera shutters comprising a slotted support including a rounded projection thereon, a stop spring pressed against the support and extending through the slot and including a depression to receive the rounded projection, the projection and depression being so shaped as to permit the stop to move relative to the support and being adapted to limit the relative movement as the rounded projection is moved on an edge of the depression, thus increasing the spring pressure as the position of the stop and support is altered.

3. In a photographic shutter, the combination with a slotted support, of a blade element pivotally mounted thereon, mechanism for driving said blade element in one direction, a stop for limiting the movement of the blade element projecting through the slotted support, said stop including a base carrying a lug movably mounted with respect to the support, cooperating formings on the base and support for limiting the movement of the lug relative to the support.

4. In a photographic shutter, the combination with a slotted support, of a blade element pivotally mounted thereon, mechanism for driving said blade element in one direction, a stop for limiting the movement of the blade element projecting through the slotted support, said stop including a base carrying a lug movably mounted with respect to the support, cooperating formings on the base and support for limiting the movement of the lug relative to the support, said formings comprising a rounded projection on one part adapted to extend into a rounded recess carried by the other part.

5. In a photographic shutter, the combination with a slotted support, of a blade element pivotally mounted thereon, mechanism for driving said blade element in one direction, a stop for limiting the movement of the blade element projecting through the slotted support, said stop including a base carrying a lug movably mounted with respect to the support, cooperating formings on the base and support for limiting the movement of the lug relative to the support, the projection being materially smaller than the recess and of the same general shape, being adapted to move therein.

HARRY W. ADAMS.